United States Patent
Randell et al.

(10) Patent No.: US 10,440,676 B2
(45) Date of Patent: Oct. 8, 2019

(54) METHOD AND APPARATUS FOR PROCESSING DATA

(71) Applicant: Viavi Solutions UK Limited, Berkshire (GB)

(72) Inventors: Nicholas James Randell, Hants (GB); Peter Kenington, Chepstow (GB); Christopher Drawater, Reading (GB)

(73) Assignee: VIAVI Solutions UK Limited, Berkshire (GB)

( * ) Notice: Subject to any disclaimer, the term of this patent is extended or adjusted under 35 U.S.C. 154(b) by 0 days.

(21) Appl. No.: 15/389,805

(22) Filed: Dec. 23, 2016

(65) Prior Publication Data
US 2017/0187795 A1  Jun. 29, 2017

Related U.S. Application Data

(63) Continuation of application No. 14/103,544, filed on Dec. 11, 2013, now abandoned.

(51) Int. Cl.
*H04W 64/00* (2009.01)
*H04W 40/20* (2009.01)
*H04L 12/911* (2013.01)
*H04L 29/08* (2006.01)
(Continued)

(52) U.S. Cl.
CPC ........... *H04W 64/00* (2013.01); *H04L 47/824* (2013.01); *H04L 47/829* (2013.01); *H04L 67/1021* (2013.01); *H04W 4/021* (2013.01); *H04W 40/20* (2013.01); *H04W 84/042* (2013.01); *Y02D 70/00* (2018.01); *Y02D 70/1242* (2018.01); *Y02D 70/1262* (2018.01); *Y02D 70/38* (2018.01)

(58) Field of Classification Search
None
See application file for complete search history.

(56) References Cited

U.S. PATENT DOCUMENTS 5,285,494 A  2/1994  Sprecher et al.
7,362,768 B1  4/2008  Dommety
(Continued)

FOREIGN PATENT DOCUMENTS

CA  2 578 302 A1  1/2007
CN  101557344  10/2009
(Continued)

OTHER PUBLICATIONS

European Search Report corresponding to EP 14 19 7440, dated Apr. 23, 2015. 9 pages.
(Continued)

*Primary Examiner* — Ernest G Tacsik
(74) *Attorney, Agent, or Firm* — Harrity & Harrity, LLP

(57) ABSTRACT

A method of processing data for at least one wireless communication network and a data processing system for implementing such a method are provided. The method comprises determining geolocation information for data segments received at a plurality of distributed components of a data processing system, the data segments being received from at least one network element of the wireless communication network, and forwarding the data segments to backend processing resources based at least partly on their respective geolocation information.

20 Claims, 5 Drawing Sheets

(51) Int. Cl.
*H04W 4/021* (2018.01)
*H04W 84/04* (2009.01)

(56) References Cited

U.S. PATENT DOCUMENTS

| | | | |
|---|---|---|---|
| 2006/0293046 A1* | 12/2006 | Smith | G06Q 10/06 |
| | | | 455/423 |
| 2010/0056163 A1 | 3/2010 | Schmidt | |
| 2010/0214943 A1* | 8/2010 | Immendorf | H04W 24/00 |
| | | | 370/252 |
| 2010/0291906 A1* | 11/2010 | Deluca | H04M 3/2281 |
| | | | 455/414.1 |
| 2011/0093522 A1 | 4/2011 | Chen et al. | |
| 2011/0225298 A1 | 9/2011 | Brown | |
| 2012/0047107 A1 | 2/2012 | Doddavula et al. | |
| 2012/0064914 A1 | 3/2012 | Suzuki | |
| 2012/0078643 A1* | 3/2012 | Nagpal | G06Q 30/02 |
| | | | 705/1.1 |
| 2012/0011055 A1 | 5/2012 | Van Biljon et al. | |
| 2012/0157088 A1 | 6/2012 | Gerber et al. | |
| 2012/0252494 A1 | 10/2012 | Parker | |
| 2013/0047230 A1 | 2/2013 | Krishnan et al. | |
| 2013/0073716 A1* | 3/2013 | DeJana | G06F 9/5077 |
| | | | 709/224 |
| 2013/0114454 A1 | 5/2013 | Hwang et al. | |
| 2014/0287739 A1 | 9/2014 | Kenington et al. | |
| 2014/0287740 A1 | 9/2014 | Kenington et al. | |
| 2014/0287741 A1 | 9/2014 | Kenington et al. | |
| 2015/0067032 A1* | 3/2015 | Djabarov | H04W 4/021 |
| | | | 709/203 |
| 2015/0163696 A1 | 6/2015 | Randell et al. | |
| 2015/0163721 A1 | 6/2015 | Randell et al. | |

FOREIGN PATENT DOCUMENTS

| | | |
|---|---|---|
| CN | 102577252 | 7/2012 |
| CN | 103209196 | 7/2013 |
| CN | 103347282 | 10/2013 |
| EP | 2 592 860 A2 | 5/2013 |
| WO | WO 2010/081658 A2 | 7/2010 |

OTHER PUBLICATIONS

European Search Report corresponding to EP 14 19 7456, dated Jun. 16, 2015, 9 pages.

* cited by examiner

METHOD AND APPARATUS FOR PROCESSING DATA

RELATED APPLICATION

This application is a continuation of U.S. patent application Ser. No. 14/103,544, filed Dec. 11, 2013, the disclosure of which is incorporated herein by reference.

FIELD OF THE INVENTION

The field of the invention relates to a method of processing data for at least one wireless communication network, and a data processing system therefor.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org).

The $3^{rd}$ and $4^{th}$ generations of wireless communications, and particular systems such as LTE (Long Term Evolution), have generally been developed to support macro-cell mobile phone communications, and more recently femto-cell mobile phone communications. Here the 'phone' may be a smart phone, or another mobile or portable communication unit that is linked wirelessly to a network through which calls etc. are connected. Henceforth all these devices will be referred to as mobile communication units. Calls may be data, video, or voice calls, or a combination of these. An increasing proportion of communications involve data rather than voice, and are technically referred to as being a 'connection', rather than a 'call'. Nevertheless, the terms 'connection' and 'call' as used herein are to be understood as being interchangeable and each referring to data, video and/or voice calls/connections unless otherwise defined.

Typically, mobile communication units, or User Equipment as they are often referred to in 3G parlance, communicate with a Core Network of the 3G (or 4G) wireless communication system. This communication is via a Radio Network Subsystem. A wireless communication system typically comprises a plurality of Radio Network Subsystems. Each Radio Network Subsystem comprises one or more cells, to which mobile communication units may attach, and thereby connect to the network. A base station may serve a cell. Each base station may have multiple antennas, each of which serves one sector of the cell.

Operators of wireless communication systems need to know what is happening in the system, with as much precision as possible. A particular issue is the need to solve 'faults'. Faults may take a wide variety of forms, but can be summarised as events when the network and/or one or more mobile communication units do not perform as expected.

In most conventional wireless networks, quality of service information is generally reported on a per-cell or per-sector basis. A result of this is that network statistics obtained may only provide an indication of the average data rate or average number of dropped calls, for example, in a given sector or cell. It is not usually possible to obtain network statistics from such conventional quality of service information for a particular portion of a sector or cell that may suffer from poor data rates or dropped calls due, in part, to these particular sectors or cells having poor coverage.

It is known to utilise and compare, in real time, the signatures of mobile communication units to determine location information. These systems are typically located at, for example, switching centres where raw communication session data is stored. Modern wireless communication systems allow a high degree of autonomy to individual mobile communication units and to base stations. As a consequence, decisions about setting up and 'tearing down' call links throughout the network are not all made centrally. As a result, a complication arises from the volume of raw communication session data generated within the wireless communication system. In one day, a wireless communication system may generate 100 gigabytes of data about calls that have been made in the network.

One constraint in particular is the processing requirements for processing the large volumes of raw data in order to obtain meaningful information. With conventional systems, which are typically located at, for example, switching centres where raw communication session data is stored, significant processing resources are required to be provided at each such location (e.g. at each switching centre) for processing the 'local' data stored at the respective location.

Such a distribution of processing resources across multiple locations within a network, with the processing resources at each location being dedicated to the processing of local data, is an inefficient use of such processing resources since often the processing resources at many of the locations may not be fully utilised. Furthermore, if the processing requirements at a particular location are increased, for example due to an increase in network capacity corresponding to that location, the processing capacity at that location may be exceeded even if only by a small amount. As a result, additional processing hardware may need to be sourced. Such a small additional processing requirement could require replacement or additional sets of processing cards, racks or storage to be implemented. In this case, a relatively large capital outlay may be required by the network operator to provide for a relatively small increase in required processing capacity.

A conventional approach to improve efficiency in mass processing systems is to provide the data to be processed to one or more centralised or shared processing resources. For example, data from distributed sites (e.g. the switching centres of a wireless communication system) may be provided to centralised processing resources or to one or more shared (e.g. cloud) processing resources. In this manner, more efficient processing of data from multiple distributed sites may be performed.

Another important requirement for the Applicant's data processing system is that users are able to access data in near real time. For example, data relating to an event is available to users within a relatively short period of time, for example within, say, a couple of minutes of the data being made available from the radio network controller (RNC), in a 3G (or 4G) wireless communication system. It is worth noting that in a conventional 3G/4G wireless communication system, data relating to recent calls is made available by RNCs in batches, for example comprising 15 minutes worth of call data. As such, data may be made available by an RNC approximately every 15 minutes, with a potential 15 minute latency for some of the call data between the respective event and the data being made available by the RNC. Because of this inherent 15 minute latency between an event occurring and the data being made available by the RNC, it is even more important to minimise any further delay between the data being made available by the RNC and the data being available to users.

This is in contrast to conventional data processing systems which perform 'batch processing' whereby data is processed off-line, and there is a delay of many hours typically between an event of interest taking place and the resulting diagnostic information being available to users. Furthermore, a relatively large number of users may be required to access data substantially simultaneously. As such, not only is there a requirement for data to be processed efficiently in terms of cost, but also in terms of enabling near real time access of data by multiple users.

Thus there is a need for an improved method and apparatus for processing data within a wireless communication network.

SUMMARY OF THE INVENTION

Accordingly, the invention seeks to mitigate, alleviate or eliminate one or more of the abovementioned disadvantages singly or in any combination.

According to a first aspect of the present invention, there is provided a method of processing data for at least one wireless communication network. The method comprises determining geolocation information for data segments received at a plurality of distributed components of a data processing system, the data segments being received from at least one network element of the wireless communication network, and forwarding the data segments to backend processing resources based at least partly on their respective geolocation information.

In this manner, data to be processed may be 'sharded' based on the geolocation information of the data segments, and allocated to backend processing resources accordingly. Advantageously, because wireless communication network data queries typically relate to data corresponding to particular geographical locations/regions, geographically sharding the data in the manner described enables the data to be allocated across a relatively large number of relatively small processing resources whilst still enabling queries to be serviced by a single (or few) processing resources. This enables a significant amount of parallelism to be implemented within the data processing system, significantly speeding up the processing of data, thereby facilitating the near-real-time access of data by users. Furthermore, by facilitating the use of relatively small processing resources in this manner, additional processing resources can be added in relatively small increments, enabling a more cost effective manner of increasing (or decreasing) processing capabilities as required.

According to a second aspect of the present invention, there is provided a data processing system for processing data from at least one wireless communication network. The data processing system comprising at least one allocation component arranged to determine geolocation information for data segments received at a plurality of distributed components of a data processing system, the data segments being received from at least one network element of the wireless communication network, and forward the data segments to backend processing resources based at least partly on their respective geolocation information.

According to a third aspect of the present invention, there is provided an allocation component of a data processing system for processing data from at least one wireless communication network. The allocation component being arranged to determine geolocation information for data segments received at a plurality of distributed components of a data processing system, the data segments being received from at least one network element of the wireless communication network, and forward the data segments to backend processing resources based at least partly on their respective geolocation information.

According to a fourth aspect of the present invention, there is provided a distributed component of a data processing system for processing data from at least one wireless communication network. The distributed component of the data processing system being arranged to receive data from at least one network element of the wireless communication network, determine geolocation information for data segments within the received data, and forward data segments within the received data to backend processing resources based at least partly on their respective geolocation information.

According to a fifth aspect of the present invention, there is provided a non-transitory computer program product having computer-readable code stored thereon for programming a data processing module to perform the method of the first aspect of the present invention.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Figure 1:
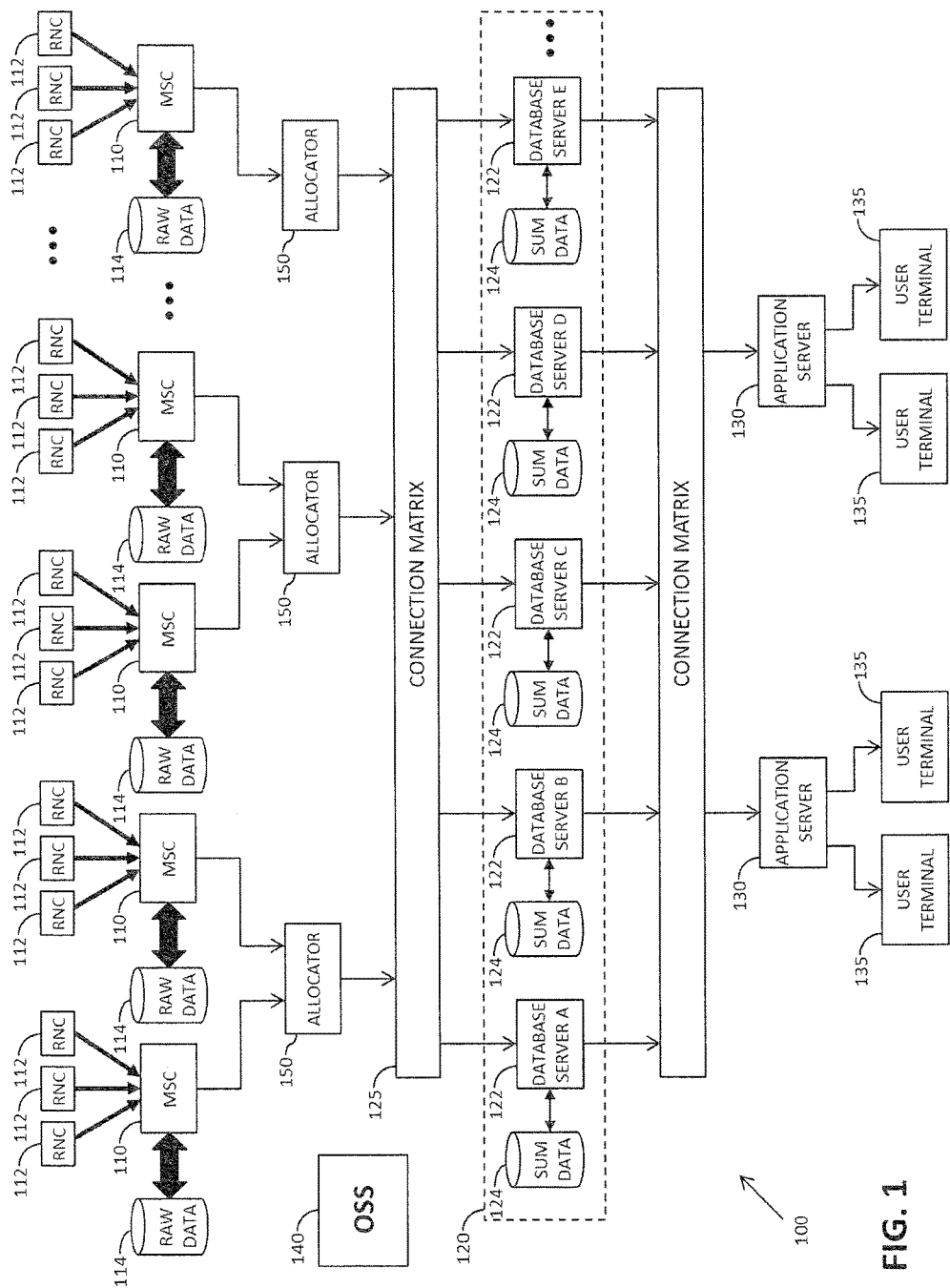
FIG. 1 illustrates a simplified block diagram of an example of a data processing system.

Examples of the invention will be described in terms of a system and a method for managing data within a wireless communication network, such as a network implemented in accordance with the $3^{rd}$ Generation (3G) and/or 4th Generation (4G) of mobile telephone standards and technology. Examples of such 3G and 4G standards and technology are the Universal Mobile Telecommunications System (UMTS™) and Long Term Evolution (LTE), developed by the $3^{rd}$ Generation Partnership Project (3GPP™) (www.3gpp.org).

According to an example of a first aspect of the present invention there is provided a method of processing data for at least one wireless communication network. The method comprises determining geolocation information for data segments received at a plurality of distributed components of a data processing system, the data segments being received from at least one network element of the wireless communication network, and forwarding the data segments to backend processing resources based at least partly on their respective geolocation information.

In some optional embodiments, the method may further comprise forwarding the data segments to backend processing resources further based on at least one of:

an anticipated volume of data for individual geographical regions; and a processing capacity of backend processing resources.

In some optional embodiments, the method may further comprise allocating predefined geographical regions to backend processing resources, identifying to which predefined geographical regions the data segments relate based at least partly on their respective geolocation information, and forwarding the data segments to the backend processing resources to which the predefined geographical regions to which they relate have been allocated.

In some optional embodiments, the method may further comprise assigning an index value to each predefined geographical region, associating backend processing resources with the index values assigned to the predefined geographical regions allocated thereto, determining geolocation information for the data segments, identifying to which predefined geographical regions data segments within the received data relate based at least partly on their respective geolocation information, and forwarding the data segments to backend processing resources associated with the index values of their respective identified predefined geographical regions.

In some optional embodiments, the method may further comprise allocating backend processing resources to predefined geographical regions based at least partly on at least one of:
  an anticipated volume of data for individual geographical regions; and
  a processing capacity of backend processing resources.

In some optional embodiments, the data segments forwarded to the backend processing resources may comprise at least one of:
  session connection setup information;
  session closedown information;
  identification of radio links involved in session;
  measured radio propagation delay;
  radio bearer or bearers involved during session;
  type of session;
  measurement reports;
  received signal code power; and
  subscriber information.

In some optional embodiments, the method may further comprise, at the backend processing resources, pre-processing received data to enable efficient storage and access of the received data, and storing the pre-processed data for subsequent processing to generate statistical data for the wireless communication network.

In some optional embodiments, the method may further comprise, at the backend processing resources, performing near-real-time processing of the stored, pre-processed data in response to requests from client applications.

In some optional embodiments, the method may further comprise receiving at a plurality of distributed components of a data processing system from at least one network element of the wireless communication network, extracting a subset of the received data, determining geolocation information for data segments within the extracted subset of the data, and forwarding the data segments within the extracted subset of the data to backend processing resources based at least partly on their respective geolocation information. Wherein the method may still further comprise, at the backend processing resources, receiving at the backend processing resources data segments from the plurality of distributed components of the processing system, and processing the received extracted data segments to generate statistical data for the wireless communication network.

In some optional embodiments, the data received at the plurality of distributed components of the data processing system may comprise raw communication session data for all communication sessions of the respective network elements.

In some optional embodiments, the method may further comprise, at the plurality of distributed components of the data processing system, storing the received raw communication session data.

According to an example of a second aspect of the present invention there is provided a data processing system for processing data from at least one wireless communication network. The data processing system comprises at least one allocation component arranged to determine geolocation information for data segments received at a plurality of distributed components of a data processing system, the data segments being received from at least one network element of the wireless communication network, and forward the data segments to backend processing resources based at least partly on their respective geolocation information.

According to an example of a third aspect of the present invention there is provided an allocation component of a data processing system for processing data from at least one wireless communication network. The allocation component is arranged to determine geolocation information for data segments received at a plurality of distributed components of a data processing system, the data segments being received from at least one network element of the wireless communication network, and forward the data segments to backend processing resources based at least partly on their respective geolocation information.

According to an example of a fourth aspect of the present invention there is provided a distributed component of a data processing system for processing data from at least one wireless communication network. The distributed component of the data processing system being arranged to receive data from at least one network element of the wireless communication network, determine geolocation information for data segments within the received data, and forward data segments within the received data to backend processing resources, based at least partly on their respective geolocation information.

Referring first to FIG. 1, there is illustrated a simplified block diagram of an example of a data processing system 100 such as may be used for storing and subsequent access of data from one or more wireless communication networks. The various components within the data processing system 100 may be implemented in any suitable manner. For example, the various components of the data processing system 100 may be implemented by way of computer program code, and arranged to be executed on one or more data processing modules. The computer program code may be stored within one or more non-transitory computer program products, for example such as one or more memory element(s). Such memory element(s) may comprise any form of computer-readable storage device, such as a hard disc, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

The data processing system 100 comprises a plurality of distributed components 110, each distributed component 110 arranged to receive data from one or more network elements 112. In the example illustrated in FIG. 1, the distributed components 110 comprise mobile switching centres (MSCs), which are arranged to receive data from radio network controllers (RNCs) 112. In a 3G system, the RNCs 112 are typically located at their respective MSC 110. In some examples, the data received by the distributed components 110 comprises raw communication session data for all communication sessions of the respective network elements 112, and each of the distributed components 110 may be arranged to store the raw communication session data, for example within local data storage devices 114. In this manner, all raw communication session data may be stored, at least for a period of time, and available should it be required to be accessed.

The data processing system 100 further comprises backend processing resources, indicated generally at 120. In the illustrated example, the backend processing resources comprise a plurality of database servers 122 arranged to receive data from the distributed components 110 and perform, for example, pre-processing of the received data to enable efficient storage and access of the received data. In the illustrated example, each database server 122 is operably coupled to one or more data storage devices 124 in which the pre-processed data may be stored, for example for subsequent processing to generate statistical data for the wireless communication network. The backend processing resources 120 may further be arranged to perform near-real-time processing of the stored, pre-processed data in response to requests from client applications. As such, in the illustrated example the backend processing resources 120 are operably coupled to one or more client servers 130 through which users operating user terminals 135 are able to access data stored within data storage devices 124. Examples of the contemplated functionality of the database server 122 are described in the Applicant's co-pending US patent applications: U.S. patent application Ser. No. 13/849,245; U.S. patent application Ser. No. 13/849,262; and U.S. patent application Ser. No. 13/849,279, all of which are incorporated by reference herein.

Figure 2:
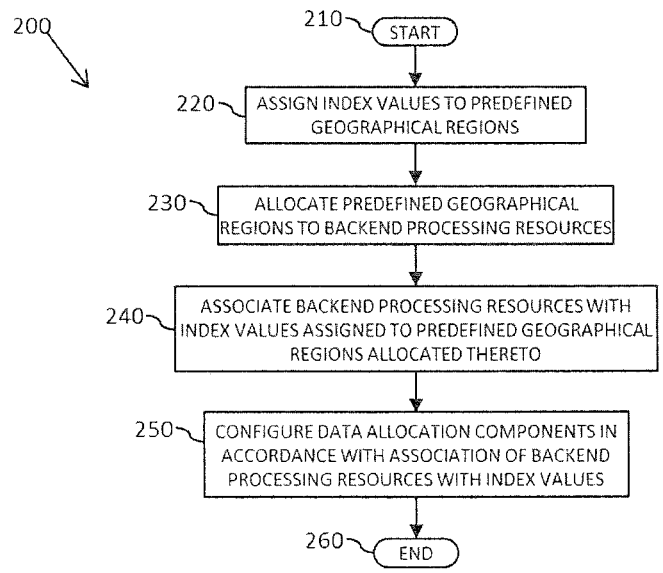
FIGS. 2 and 3 illustrate simplified flowcharts of an example of a method of processing data for a wireless communication network.
Figure 3:
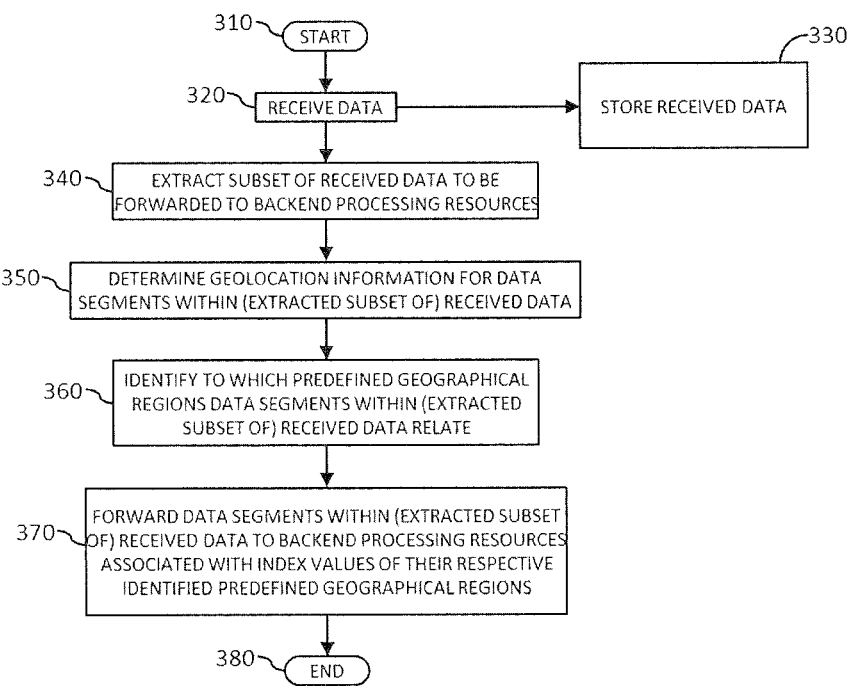

Referring now to FIGS. 2 and 3, there are illustrated simplified flowcharts 200, 300 of an example of a method of processing data from a wireless communication network, such as may be implemented within the data processing system 100 of FIG. 1, and which enables data from a wireless communication network to be processed in an efficient and cost effective manner, whilst also enabling near real time access of data by multiple users.

Referring first to FIG. 2, the method steps illustrated in FIG. 2 may be performed within any appropriate part of the data processing system or of the wireless communication network of which the distributed components 110 thereof form a part. For example, the method steps illustrated in FIG. 2 may be performed within an operations support system (OSS) of the wireless communication network, such as illustrated at 140 in FIG. 1.

Figure 4:
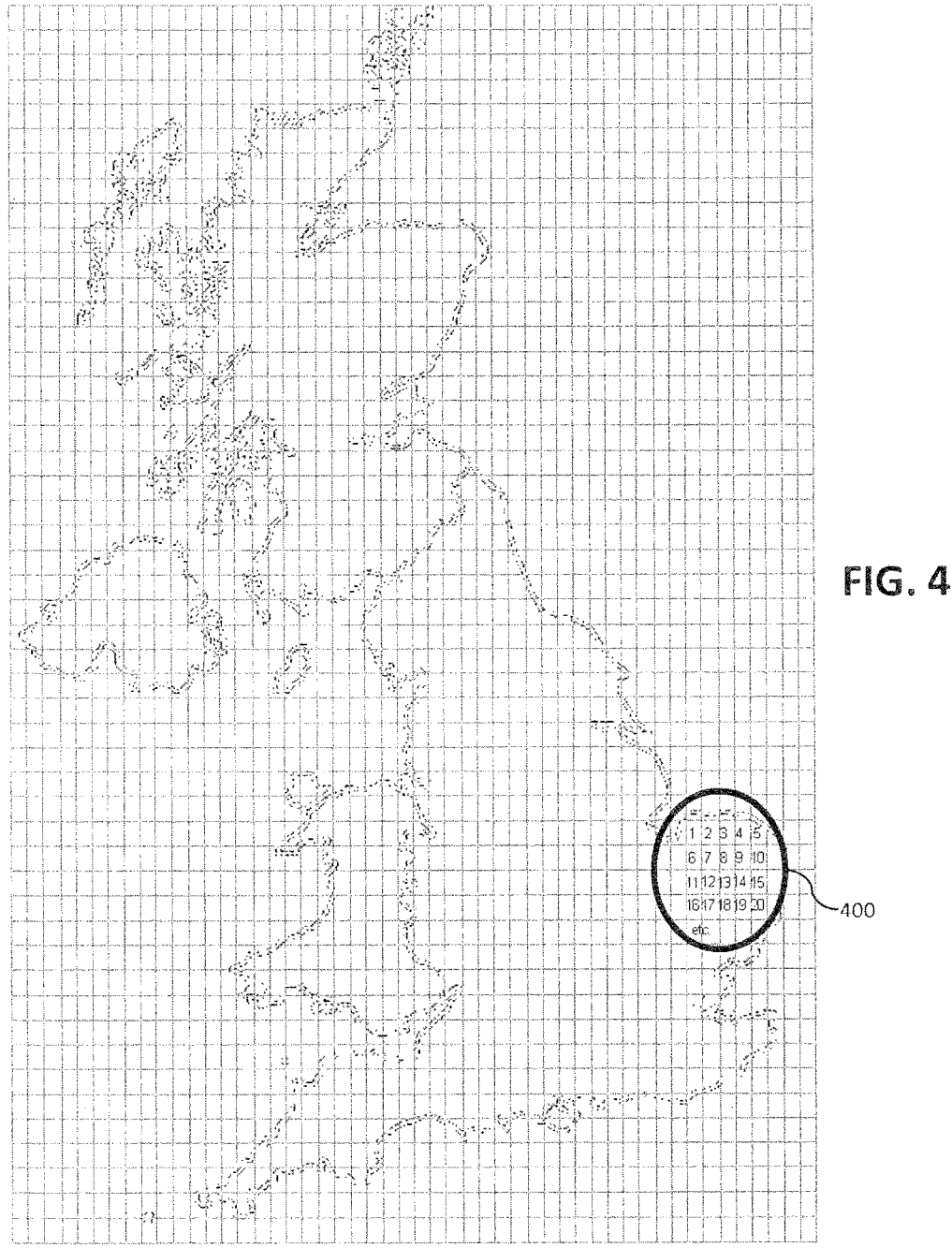
FIG. 4 illustrates a coverage area of the wireless communication network.

The method starts at 210 and moves on to step 220 where, in the illustrated example, index values are assigned to predefined geographical regions. For example, and as illustrated in FIG. 4, a coverage area of the wireless communication network, which in the example illustrated in FIG. 4 comprises the United Kingdom, may be divided into a number of geographic regions (for example of, say, a few square kilometers, although this could be any suitable area depending upon the capabilities of the processing/storage units available within the backend resources and the anticipated volume of calls in the geography as a whole). In the example illustrated in FIG. 4, a simple grid system has been used to divide up the coverage area into predefined geographical regions. However, it will be appreciated that any suitable system may be used, and the present invention is not limited to such a uniform grid system.

The geographical regions are each assigned an index value, for example such as a simple index number as indicated at 400 in FIG. 4. However, it will be appreciated that any suitable indexing system may be used and the present invention is not limited to the simple numbering system illustrated in FIG. 4, and herein described. For example, an indexing system using, say, a grid reference or latitude/longitude co-ordinates, etc. of a centre point of the respective geographical region may alternatively be used.

Having assigned index values to the predefined geographical regions, the method moves on to step 230 where predefined geographical regions are allocated to backend processing resources. The method may comprise allocating backend processing resources to predefined geographical regions based on any suitable parameters such as anticipated volumes of data for individual geographical regions, processing capacities of backend processing resources, etc. In this manner, the distribution of the required processing of data may be allocated across the backend processing resources in such a manner as to evenly distribute the processing load across the backend processing resources relative to the processing capabilities of the individual backend processing resources.

In some examples, such as the example herein described, it is contemplated that geographical regions of substantially equal size may be defined. As such, the volumes of data for individual geographical regions will vary significantly. For example, primarily rural geographical regions will typical comprise significantly smaller volumes of data than, say, inner city geographical regions. In this manner, the allocation of geographical regions to backend processing resources may be implemented to take into account such variations in volumes of traffic between geographical regions.

In some alternative examples it is contemplated that geographical regions may alternatively be defined in order to achieve a substantially uniform anticipated volume of traffic within each geographical region. In this manner, a substantially even allocation of geographical regions to backend processing resources may be implemented.

In the illustrated example, once the geographical regions have been allocated to backend processing resources, the method moves on to step 240 where the backend processing resources are associated with the index values assigned to the predefined geographical regions allocated thereto. For example, five database servers 122 are illustrated in FIG. 1, labelled A to E. Each database server 122 may have allocated thereto one or more predefined geographical regions. Accordingly, each database server 122 may be associated with one or more corresponding index values. Table 1 below illustrates an example of the index values 400 for the geographical regions illustrated in FIG. 4 being assigned to the database servers 122 of FIG. 1.

TABLE 1

Example of Assignment of Region Indexes to Backend Resources

| Region Index | | | | | | | | | | | | |
|---|---|---|---|---|---|---|---|---|---|---|---|---|
| | 1 | 2 | 3 | 4 | 5 | 6 | 7 | 8 | 9 | 10 | 11 | ... n |
| DB Server | A | A | A | A | B | B | C | C | D | E | E | ... N |

In the example illustrated in Table 1, four geographical regions have been assigned to database server A, whilst two geographical regions have been assigned to each of database servers B, C and E and a single geographical region has been assigned to database server D. Four geographical regions may have been assigned to database server A due to, say, those four regions having relatively low anticipated volumes of data and/or database server A comprising relatively high processing and/or storage capabilities. Conversely, only a single geographical region may have been assigned to database server D due to that geographical region comprising a relatively high anticipated volume of data and/or database server D comprising a relatively low processing and/or storage capability. In this way, overloading and/or underutilisation of backend processing resources may be substantially avoided, with each processing its data independently of the others (i.e. in parallel). This use of parallel processing, together with appropriate allocation of data to backend processing resources leads to a suitably fast response time for the users whilst utilising affordable (and easily expanded) hardware.

Advantageously, by allocating backend resources on a geographical basis as described above enables geographical based queries to be handled more efficiently. For example, if the backend processing resources were allocated in a non-geographical basis, for example 'on the fly' with each item to be processed being allocated to the least busy (or full) processor/server, geographic based queries would need to fetch data from a huge number of locations across a number of servers, greatly reducing access speeds to the required data and hence greatly slowing the fulfillment of the query. The present invention takes advantage of the fact that the volumes of data generated by each geographic region are typically predictable and also relatively invariant (the 'average' daily populations, both static and mobile, of each region will typically not change quickly over time) and hence allocation by geography is a good way of allocating processing/storage resources, without undue wastage.

Having associated backend processing resources with the index values assigned to the predefined geographical regions allocated thereto, the method moves on to step 250 where one or more data allocation components, such as those illustrated at 150 in FIG. 1, are configured in accordance with the association of backend processing resources with index values. The part of the method of the flowchart 200 of FIG. 2 then ends at 260.

Referring back to FIG. 1, having been configured, the data allocation components 150 are able to determine to which backend resources individual data segments received from the network elements are to be forwarded to, for example in accordance with the method steps of FIG. 3.

Referring now to FIG. 3, this part of the method starts at 310 and moves on to step 320 where data from network elements of one or more wireless communication networks is received at a plurality of distributed components of a data processing system. In the example illustrated in FIG. 1, such data is received at the MSCs 110 as a stream of data from each of the RNCs 112. The raw (i.e. unprocessed) data may be stored (at least for a period of time), as illustrated at step 330, for example within the local data storage devices 114.

The raw, unprocessed data from the RNCs 112 represents a huge amount of information that would require a very high speed, and very expensive, communications link in order to transport the data to backend processing resources. Accordingly, in the illustrated example, a subset of the received (raw) data to be forwarded to the backend processing resources is extracted at 340. For example, only those data elements needed in most or all cases by data processing algorithms may be extracted from the received (raw) data. For example, in the case where the raw data received comprises 'layer 3' network information, the data elements extracted for forwarding to the backend processing may comprise:
   session connection setup information;
   session closedown information;
   identification of radio links involved in session;
   measured radio propagation delay;
   radio bearer or bearers involved during session;
   type of session;
   measurement reports;
   received signal code power;
   subscriber information;
   etc.

By extracting only a subset of the raw data for forwarding to the backend data processing in this manner, a reduced bandwidth may be used to forward such data to the backend processing resources.

Geolocation information is then determined at 350 for data segments within the extracted subset of the received data. Geolocation is the identification of the real-world geographical location of an object, such as a mobile communication unit. Geolocation techniques are well known in the art, and as such need not be described in any greater detail herein. Nevertheless, one example implementation of geolocation is described in the Applicant's co-pending International Patent Application No. WO 2010/081658 entitled "GEO-LOCATION IN A WIRELESS COMMUNICATION NETWORK" which is herein incorporated by reference.

Next, at step 360, the geolocation information determined at step 350 is used to identify to which predefined geographical regions the individual data segments within the extracted subset of received data relate. The data segments are then forwarded to backend processing resources associated with index values of their respective identified geographical regions, at step 370.

For example, based on Table 1 above: data segments that have been identified as relating to the geographical regions to which index values 1 to 4 have been assigned would be forwarded to database server A; data segments that have been identified as relating to the geographical regions to which index values 5 and 6 have been assigned would be forwarded to database server B; data segments that have been identified as relating to the geographical regions to which index values 7 and 8 have been assigned would be forwarded to database server C, etc. It will be appreciated that, by allocating backend processing resources to predefined geographical regions based on parameters such as anticipated volumes of data for individual geographical regions, processing capacities of backend processing resources, etc., and then forwarding the data segments within the received data to backend processing resources based on their respective geolocation information, the data segments are effectively forwarded to backend processing resourced based on those parameters (i.e. anticipated volumes of data for individual geographical regions, processing capacities of backend processing resources, etc.).

In the example illustrated in FIG. 1, a connection matrix 125 is illustrated as operably coupling the allocation components 150 to the backend processing resources 120, and via which the data segments are forwarded to backend processing resources 120. However, it will be appreciated that any suitable medium for enabling the data segments to be forwarded to the appropriate backend processing resources 120 may be implemented. The method then ends, at 380.

In this manner, data to be processed is 'sharded' based on the geolocation information of the data segments, and allocated to backend processing resources accordingly. Advantageously, because wireless communication network data queries typically relate to data corresponding to particular geographical locations/regions, geographically sharding the data in the manner described enables the data to be allocated across a relatively large number of relatively small processing resources whilst still enabling queries to be serviced by a single (or few) processing resources. This enables a significant amount of parallelism to be implemented within the data processing system, significantly speeding up the processing of data, thereby facilitating the near-real-time access of data by users. Furthermore, by enabling the use of relatively small processing resources in this manner, additional processing resources can be added in relatively small increments, enabling a more cost effective manner of increasing (or decreasing) processing capabilities as required.

Thus, in accordance with some examples of the present invention, it is proposed that a large number of small, low-cost, processing and storage elements are used to provide the backend processing resources. It will be appreciated that the backend processing resource hardware may in some examples be co-located with one or more of the MSCs 110 hardware, or a similar location. Equally, it may be located in a separate (operator-owned or third-party) data centre.

As will be appreciated by a skilled person, data is typically received by the MSCs 110 as a substantially continuous stream of data from the RNCs 112. As such, for some examples of the present invention the method steps of FIG. 3 are to be understood as being implemented as a substantially continuous process whereby the various steps are performed substantially simultaneously in a pipeline manner for received data streams.

Referring back to FIG. 1, in this illustrated example it is contemplated that the extraction of a subset of the received data at step 340 of the method of FIG. 3 may be performed by the MSCs 110. Furthermore, it is contemplated that the allocation and forwarding of data segments to backend processing resources based on their respective identified predefined geographical regions at step 370 of the method of FIG. 3 is performed by the allocation components 150. In this manner, the MSCs, upon receipt of the raw data streams from the RNCs 112, may extract the subset of data to be forwarded to the backend processing, thereby reducing the required bandwidth for the transmission of data to the backend processing resources. The extracted subset of data may then be provided to the allocation components 150 for forwarding to the appropriate backend processing resources.

The determining of geolocation information at step 350 of the method of FIG. 3 and the identification of which predefined geographical regions the data segments relate to, at step 360 of the method of FIG. 3, may be performed by either the MSCs 110 or the allocation components 150, and equally steps 350 and 360 may be split between the MSCs 110 and the allocation components 150.

Figure 5:
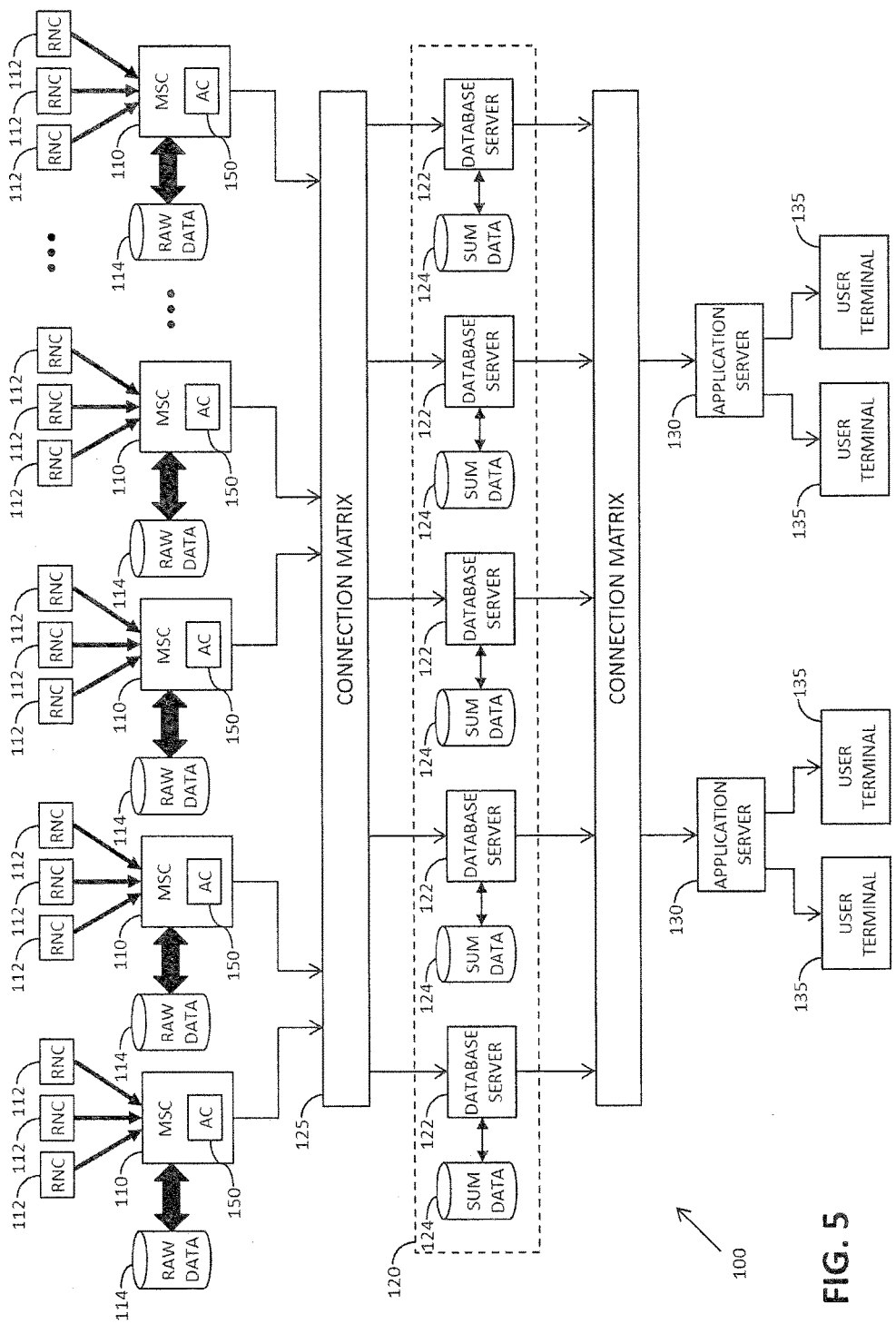
FIG. 5 illustrates a simplified block diagram of an alternative example of a data processing system.

In the example illustrated in FIG. 1, the allocation components 150 have been illustrated as discrete components of the data processing system 100, for example implemented within computer systems separate to the MSCs 110. However, as illustrated in FIG. 5, it is contemplated that some or all of the allocation components 150 may additionally/alternatively be implemented (entirely or in part) within the MSCs 112.

It will be appreciated that the re-allocation of geographical regions to back processing resources and/or the re-definition of geographical regions, and the re-assignment of index values therefor, may be performed at any time, for example by implementing the method steps of FIG. 2.

Figure 6:
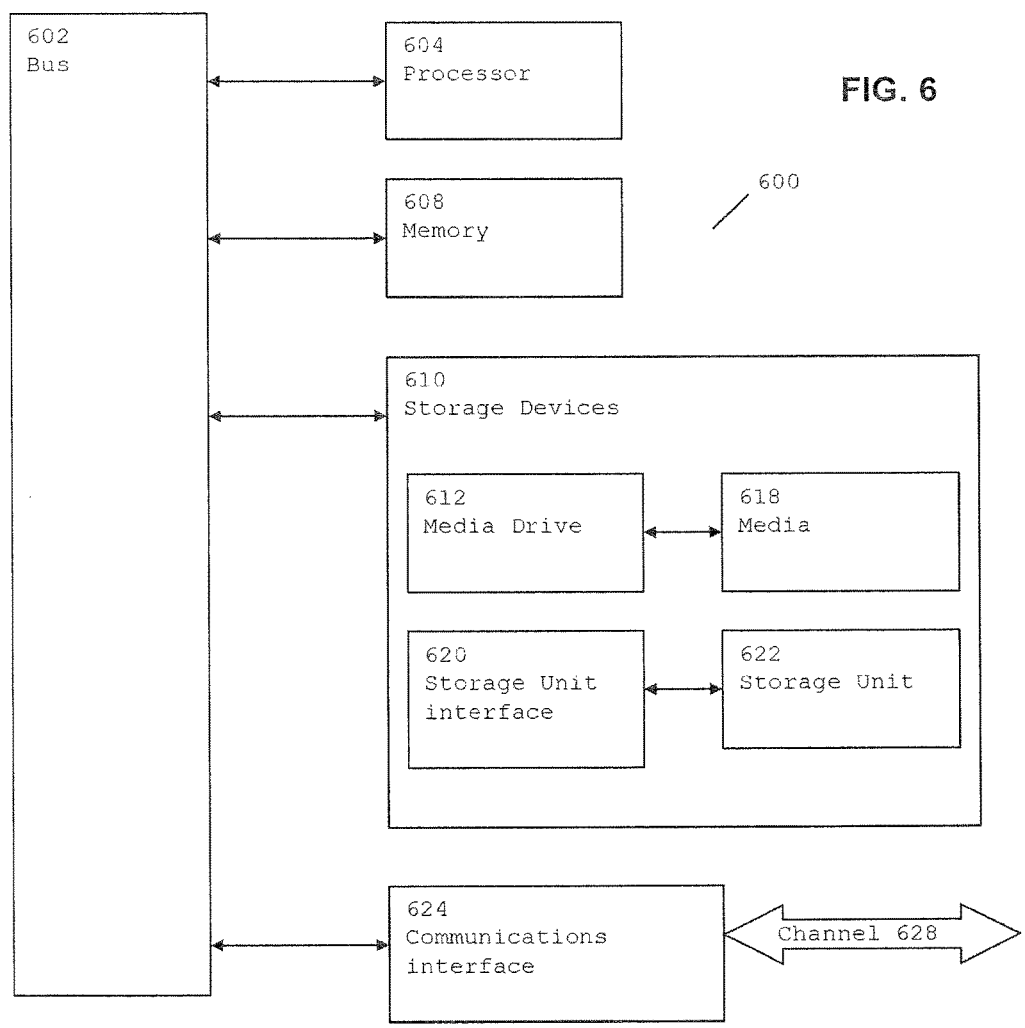
FIG. 6 illustrates a typical computing system that may be employed to implement data processing functionality in embodiments of the invention.

Referring now to FIG. 6, there is illustrated a typical computing system 600 that may be employed to implement data processing functionality in embodiments of the invention. For example, a computing system of this type may be used within one or more of the MSCs 110, allocation components 150 and/or backend processing resources 120 of FIG. 1. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special-purpose processing engine such as, for example, a microprocessor, microcontroller or other control module. In this example, processor 604 is connected to a bus 602 or other communications medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory (ROM) or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 618 may include, for example, a hard disk, floppy disk, magnetic tape, optical disk, CD or DVD, or other fixed or removable medium that is read by and written to by media drive 612. As these examples illustrate, the storage media 618 may include a computer-readable storage medium having particular computer software or data stored therein.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a universal serial bus (USB) port), a PCMCIA slot and card, etc. Software and data transferred via communications interface 624 are in the form of signals which can be electronic, electromagnetic, and optical or other signals capable of being received by communications interface 624. These signals are provided to communications interface 624 via a channel 628. This channel 628 may carry signals and may be implemented using a wireless medium, wire or cable, fibre optics, or other communications medium. Some examples of a channel include a phone line, a wireless phone link, an RF link, a network interface, a local or wide area network, and other communications channels.

In this document, the terms 'computer program product' computer-readable medium' and the like may be used generally to refer to media such as, for example, memory 608, storage device 618, or storage unit 622. These and other forms of computer-readable media may store one or more instructions for use by processor 604, to cause the processor to perform specified operations. Such instructions, generally referred to as 'computer program code' (which may be grouped in the form of computer programs or other groupings), when executed, enable the computing system 600 to perform functions of embodiments of the present invention. Note that the code may directly cause the processor to perform specified operations, be compiled to do so, and/or be combined with other software, hardware, and/or firmware elements (e.g. libraries for performing standard functions) to do so.

As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being "non-transitory" whereas a signal carrier in transit is to be considered "transitory" notwithstanding that the signal may remain in transit for a lengthy period of time.

In an embodiment where the elements are implemented using software, the software may be stored in a computer-readable medium and loaded into computing system 600 using, for example, removable storage drive 622, drive 612 or communications interface 624. The control module (in this example, software instructions or computer program code), when executed by the processor 604, causes the processor 604 to perform the functions of the invention as described herein.

Furthermore, the inventive concept can be applied to any signal processing circuit. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors may be used without detracting from the invention. For example, functionality illustrated to be performed by the same processor or controller may be performed by separate processors or controllers. Hence, references to specific functional units are only to be seen as references to suitable means for providing the described functionality, rather than indicative of a strict logical or physical structure or organization.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the broader spirit and scope of the invention as set forth in the appended claims. Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A method comprising:
   receiving, by a device, geolocation information for data segments received at a plurality of distributed components of a data processing system,
      the data segments being received from a plurality of network elements of a wireless communication network, and
      a plurality of geographic regions being defined within a coverage area of the wireless communication network;
   identifying, by the device and for each respective data segment of the data segments, a particular geographic region, of the plurality of geographic regions, to which a respective data segment relates based on the geolocation information for the respective data segment;
   determining, by the device and for each respective data segment, a respective centralized backend processing resource, of a plurality of centralized backend processing resources, assigned to the particular geographic region from which to process data based on information that indicates assignments of each geographic region, of the plurality of geographic regions, to the respective centralized backend processing resource,
      the plurality of centralized backend processing resources being shared to process data from the plurality of geographic regions,
      each of the plurality of geographic regions from which to process data being assignable to each of the plurality of centralized backend processing resources and assigned to a single centralized backend processing resource that processes all data segments related to an assigned geographic region; and forwarding, by the device, the data segments to the plurality of centralized backend processing resources based on the respective centralized backend processing resource determined for each respective data segment.

2. The method of claim 1, further comprising:

defining the plurality of geographic regions within the coverage area of the wireless communication network; and assigning each geographic region with the respective centralized backend processing resource of the plurality of centralized backend processing resources.

3. The method of claim 2, where defining the plurality of geographic regions comprises:

defining the plurality of geographic regions to be substantially equal size.

4. The method of claim 2, where defining the plurality of geographic regions comprises:

defining the plurality of geographic regions to achieve a substantially uniform anticipated volume of communication session data, to be processed by the plurality of centralized backend processing resources, within each geographic region.

5. The method of claim 1, where each geographic region, including the particular geographic region, being assigned to the respective centralized backend processing resource, enables the respective centralized backend processing resource to handle a geographical based query for a respective geographic region.

6. The method of claim 1, where the data segments forwarded to the plurality of centralized backend processing resources comprise at least one of:

session connection setup information, session closedown information, identification information of radio links involved in session, measured radio propagation delay information, radio bearer or bearers information involved during session, information associated with a type of session, one or more measurement reports, received signal code power information, or sub scriber information.

7. The method of claim 1, where the data segments forwarded to the plurality of centralized backend processing resources comprise raw communication session data for all communication sessions of the network elements.

8. A device comprising:

a processor to:

receive geolocation information for data segments received at a plurality of distributed components of a data processing system, the data segments being received from a plurality of network elements of a wireless communication network, and a plurality of geographic regions being defined within a coverage area of the wireless communication network;

identify, for each respective data segment of the data segments, a particular geographic region, of the plurality of geographic regions, to which a respective data segment relates based on the geolocation information for the respective data segment;

determine, for each respective data segment, a respective centralized backend processing resource, of a plurality of centralized backend processing resources, assigned to the particular geographic region from which to process data based on information that indicates assignments of each geographic region, of the plurality of geographic regions, to the respective centralized backend processing resource, the plurality of centralized backend processing resources being shared to process data from the plurality of geographic regions, and each of the plurality of geographic regions from which to process data being assignable to each of the plurality of centralized backend processing resources and assigned to a single centralized backend processing resource that processes all data segments related to an assigned geographic region; and forward the data segments to the plurality of centralized backend processing resources based on the respective centralized backend processing resource determined for each respective data segment.

9. The device of claim 8, where the processor is further to:

define the plurality of geographic regions within the coverage area of the wireless communication network; and assign each geographic region with the respective centralized backend processing resource of the plurality of centralized backend processing resources.

10. The device of claim 9, where the processor, when defining the plurality of geographic regions, is to:

define the plurality of geographic regions to be substantially equal size.

11. The device of claim 9, where the processor, when defining the plurality of geographic regions, is to:

define the plurality of geographic regions to achieve a substantially uniform anticipated volume of communication session data, to be processed by the plurality of centralized backend processing resources, within each geographic region.

12. The device of claim 8, where each geographic region, including the particular geographic region, being assigned to the respective centralized backend processing resource, enables the respective centralized backend processing resource to handle a geographical based query for a respective geographic region.

13. The device of claim 8, where the data segments forwarded to the plurality of centralized backend processing resources comprise at least one of:

session connection setup information, session closedown information, identification information of radio links involved in session, measured radio propagation delay information, radio bearer or bearers information involved during session, information associated with a type of session, one or more measurement reports, received signal code power information, or sub scriber information.

14. The device of claim 8, where the data segments received at the plurality of distributed components of the data processing system comprise raw communication session data for all communication sessions of the network elements.

15. A non-transitory computer-readable medium storing instructions, the instructions comprising:
one or more instructions that, when executed by one or more processors, cause the one or more processors to:
receive geolocation information for data segments received at a plurality of distributed components of a data processing system,
the data segments being received from a plurality of network elements of a wireless communication network, and
a plurality of geographic regions being defined within a coverage area of the wireless communication network;
identify, for each respective data segment of the data segments, a particular geographic region, of the plurality of geographic regions, to which a respective data segment relates based on the geolocation information for the respective data segment;
determine, for each respective data segment, a respective centralized backend processing resource, of a plurality of centralized backend processing resources, assigned to the particular geographic region from which to process data based on information that indicates assignments of each geographic region, of the plurality of geographic regions, to the respective centralized backend processing resource,
the plurality of centralized backend processing resources being shared to process data from the plurality of geographic regions, and
each of the plurality of geographic regions from which to process data being assignable to each of the plurality of centralized backend processing resources and assigned to a single centralized backend processing resource that processes all data segments related to an assigned geographic region; and
forward the data segments to the plurality of centralized backend processing resources based on the respective centralized backend processing resources determined for each respective data segment.

16. The non-transitory computer-readable medium of claim 15, where the one or more instructions further cause the one or more processors to:
define the plurality of geographic regions within the coverage area of the wireless communication network; and
assign each geographic region with the respective centralized backend processing resource of the plurality of centralized backend processing resources.

17. The non-transitory computer-readable medium of claim 16, where the one or more instructions, that cause the one or more processors to define the plurality of geographic regions, cause the one or more processors to:
define the plurality of geographic regions to be substantially equal size.

18. The non-transitory computer-readable medium of claim 16, where the one or more instructions, that cause the one or more processors to define the plurality of geographic regions, cause the one or more processors to:
define the plurality of geographic regions to achieve a substantially uniform anticipated volume of communication session data, to be processed by the plurality of centralized backend processing resources, within each geographic region.

19. The non-transitory computer-readable medium of claim 15, where each geographic region being assigned to the respective centralized backend processing resource, enables the respective centralized backend processing resource to handle a geographical based query for a respective geographic region.

20. The method of claim 1, where the respective centralized backend processing resource is assigned to multiple geographic regions of the plurality of geographic regions.

* * * * *